(12) United States Patent
Hessling- Von Heimendahl et al.

(10) Patent No.: US 11,565,827 B2
(45) Date of Patent: Jan. 31, 2023

(54) ROTORCRAFT LIGHTING EQUIPMENT, ROTORCRAFT COMPRISING SUCH EQUIPMENT, AND METHOD OF ILLUMINATING AN ENVIRONMENT OF A ROTORCRAFT

(71) Applicant: Goodrich Lighting Systems GmbH, Lippstadt (DE)

(72) Inventors: Andre Hessling- Von Heimendahl, Koblenz (DE); Anil Kumar Jha, Lippstadt (DE); Andreas Ueberschaer, Guetersloh (DE)

(73) Assignee: GOODRICH LIGHTING SYSTEMS GMBH, Lippstadt (DE)

(*) Notice: Subject to any disclaimer, the term of this patent is extended or adjusted under 35 U.S.C. 154(b) by 0 days.

(21) Appl. No.: 17/231,404

(22) Filed: Apr. 15, 2021

(65) Prior Publication Data

US 2021/0323695 A1 Oct. 21, 2021

(30) Foreign Application Priority Data

Apr. 17, 2020 (DE) .......................... 102020110511.8

(51) Int. Cl.
| | | |
|---|---|---|
| B64D 47/02 | (2006.01) | |
| H05B 45/10 | (2020.01) | |
| F21S 2/00 | (2016.01) | |
| F21V 5/04 | (2006.01) | |
| F21Y 105/18 | (2016.01) | |

(Continued)

(52) U.S. Cl.
CPC .............. *B64D 47/02* (2013.01); *F21S 2/005* (2013.01); *F21V 5/04* (2013.01); *H05B 45/10* (2020.01); *B64D 2203/00* (2013.01); *F21Y 2105/16* (2016.08); *F21Y 2105/18* (2016.08); *F21Y 2115/10* (2016.08)

(58) Field of Classification Search
None
See application file for complete search history.

(56) References Cited

U.S. PATENT DOCUMENTS

| | | |
|---|---|---|
| 3,807,803 A | 4/1974 | Rollins et al. |
| 3,836,541 A1 | 9/2014 | Fidanza |

(Continued)

FOREIGN PATENT DOCUMENTS

| | | |
|---|---|---|
| EP | 2388760 A1 | 11/2011 |
| EP | 3012151 A1 | 4/2016 |

(Continued)

OTHER PUBLICATIONS

Extended European Search Report for International Application No. 21162313.7 dated Aug. 18, 2021, 8 pages.

*Primary Examiner* — Dedei K Hammond
(74) *Attorney, Agent, or Firm* — Cantor Colburn LLP

(57) ABSTRACT

Rotorcraft lighting equipment includes a plurality of lighting devices configured to be mounted to an exterior of a rotorcraft, wherein each of the lighting devices comprises a plurality of individually controllable lighting modules which are configured for emitting light into different spatial directions; and a lighting control device configured for individually controlling the operation of the plurality of lighting modules for generating a desired light distribution of the light emitted by the plurality of lighting modules.

15 Claims, 4 Drawing Sheets

(51) Int. Cl.
*F21Y 105/16* (2016.01)
*F21Y 115/10* (2016.01)

(56) References Cited

U.S. PATENT DOCUMENTS

| | | | |
|---|---|---|---|
| 8,836,541 B2 * | 9/2014 | Fidanza | B64D 47/04 |
| | | | 340/984 |
| 9,635,739 B2 | 4/2017 | Schoen et al. | |
| 9,777,903 B2 | 10/2017 | Jha et al. | |
| 10,518,899 B2 | 12/2019 | Jha et al. | |
| 2018/0306398 A1 | 10/2018 | Rayer | |
| 2019/0063713 A1 | 2/2019 | Hessling-Von Heimendahl et al. | |

FOREIGN PATENT DOCUMENTS

| | | | | |
|---|---|---|---|---|
| EP | 3072819 A1 * | 9/2016 | | B64D 47/06 |
| EP | 3109158 A1 | 12/2016 | | |
| EP | 3118123 A1 * | 1/2017 | | B60Q 1/1423 |
| EP | 3118123 A1 | 1/2017 | | |
| EP | 3572333 A1 | 11/2019 | | |
| EP | 3757017 A1 * | 12/2020 | | B64D 47/02 |

* cited by examiner

ROTORCRAFT LIGHTING EQUIPMENT, ROTORCRAFT COMPRISING SUCH EQUIPMENT, AND METHOD OF ILLUMINATING AN ENVIRONMENT OF A ROTORCRAFT

FOREIGN PRIORITY

This application claims priority to German Patent Application No. 102020110511.8 filed Apr. 17, 2020, the entire contents of which is incorporated herein by reference.

TECHNICAL FIELD

The invention relates to rotorcraft lighting equipment, i.e. to lighting equipment to be mounted to a rotorcraft, such as a helicopter or a drone. The invention further relates to a rotorcraft comprising such rotorcraft lighting equipment and to a method of operating rotorcraft lighting equipment.

BACKGROUND

Rotorcraft are often equipped with exterior lights, such as landing lights and search lights, which are configured for emitting one or more light beams for enhancing the visibility of objects, such as obstacles and human beings, in the vicinity and/or in the flight path of the rotorcraft.

The options of adjusting the distribution of light emitted by conventional exterior lights, however, are limited. In consequence, it may not be possible to adjust the distribution of the emitted light to the respective needs under a wide range of environmental and operational circumstances in a satisfactory manner.

Accordingly, it would be beneficial to provide improved rotorcraft lighting equipment, providing more flexibility for adjusting the distribution of the light emitted by the rotorcraft lighting equipment.

SUMMARY

According to an exemplary embodiment of the invention, rotorcraft lighting equipment comprises a plurality of lighting devices, which are configured to be mounted to an exterior of a rotorcraft, each of the lighting devices comprising a plurality of individually controllable lighting modules, which are configured for emitting light into different spatial directions. The rotorcraft lighting equipment further comprises a lighting control device, which is configured for individually controlling the operation of the plurality of lighting modules for generating a desired light distribution of the light emitted by the plurality of lighting modules.

Exemplary embodiments of the invention further include a rotorcraft, in particular a helicopter and/or a drone, comprising rotorcraft lighting equipment according to an exemplary embodiment of the invention.

Exemplary embodiments of the invention also include a method of illuminating an environment of a rotorcraft via a rotorcraft lighting equipment having a plurality of lighting devices, mounted to different positions of an exterior of the rotorcraft, with each of the lighting devices having a plurality of individually controllable lighting modules arranged for emitting light into different spatial directions, wherein the method comprises: individually controlling the plurality of lighting modules of the plurality of lighting devices, depending on the respective spatial directions, for generating a desired light distribution in the environment of the rotorcraft.

Rotorcraft lighting equipment and methods of operating rotorcraft lighting equipment according to exemplary embodiments of the invention allow individually and continuously adjusting the distribution of light, emitted by the rotorcraft lighting equipment, to the current needs. Rotorcraft lighting equipment and methods of operating rotorcraft lighting equipment according to exemplary embodiments of the invention in particular allow for simultaneously illuminating different objects independently of each other. As a result, the distribution of light, emitted by the rotorcraft lighting equipment, may be optimized to the current operational condition and environment of the rotorcraft. The desired light distribution may comprise one or more illumination components. In particular, the desired light distribution may comprise at least one of a landing zone illumination component, a search area illumination component, a winch operation area illumination component, and an obstacle illumination component. The desired light distribution may comprise any subset or all of the landing zone illumination component, the search area illumination component, the winch operation area illumination component, and the obstacle illumination component.

According to an embodiment of the invention, lighting devices of the rotorcraft lighting equipment are configured to be mounted to different positions/locations of the exterior of the rotorcraft. This may allow the lighting devices to emit light in widely different directions from the rotorcraft. As a result, an area covering a large angular range surrounding the rotorcraft may be illuminated by the lighting devices. The rotorcraft may in particular be configured for selectively illuminating areas located in front of, behind, laterally from and/or below the rotorcraft.

According to an embodiment, each of the lighting devices is configured for emitting light with an intensity of at least 20 kcd, in particular with an intensity of at least 200 kcd. Lighting devices configured for emitting light with intensities of at least 20 kcd, in particular with intensities of at least 200 kcd, may provide for an effective illumination of the environment, in particular for detecting target objects in a dark environment.

According to an embodiment of the invention, each of the lighting modules comprises a plurality of lighting elements configured for emitting light into different spatial directions. Each of the plurality of lighting elements may be individually controllable by the lighting control device, and the lighting control device may be configured for individually controlling the operation of each of the plurality of lighting elements. Controlling the lighting elements may include individually switching the lighting elements on and off. Controlling the lighting elements may also include individually dimming the lighting elements, i.e. individually adjusting the amount (brightness) of light emitted by each of the lighting elements. The capability of individually controlling a plurality of lighting elements, provided in each of the lighting modules, increases the flexibility of adjusting the distribution of light, emitted by the rotorcraft lighting equipment, even further. The multi-layered approach of the rotorcraft lighting equipment having a plurality of lighting devices, which in turn have light modules, which in turn have lighting elements, may provide for a beneficial compromise between mechanical complexity, control complexity, and spatial resolution of the rotorcraft lighting equipment as a whole.

According to an embodiment, each of the plurality of lighting elements comprises at least one light source, in particular at least one LED. LEDs provide reliable light sources, having a high efficiency at comparatively low cost.

Each of the plurality of lighting elements may comprise exactly one light source. Each of the plurality of lighting elements may also comprise multiple light sources for increasing the amount of light which can be emitted by the respective lighting element. The light sources may be configured for emitting white light, in particular white light having a color temperature of at least 3300 K, more particularly white light having a color temperature of at least 5300 K, and/or colored light, in particular yellow and/or orange light. The light sources further may be configured for emitting infrared light.

According to an embodiment, each of the lighting modules comprises an array of at least 30×30, in particular 32×32 or 64×64 lighting elements, respectively. Each of the lighting modules may comprise an array of between 30×30 and 200×200 lighting elements, in particular an array of between 30×30 and 100×100 lighting elements. Providing an array of at least 30×30 lighting elements in each of the lighting modules provides a large amount of flexibility for adjusting the distribution of light, emitted by the rotorcraft lighting equipment, to the current needs.

According to an embodiment, each of the plurality of lighting elements comprises at least one optical element, associated with the light source of the lighting element in question and configured for directing and/or focusing the light emitted by the respective associated light source. The at least one optical element may comprise one or more lenses and/or one or more reflectors and/or one or more shutters. The at least one optical element may in particular include a collimating lens and/or a collimating reflector. Providing optical elements, respectively associated with one of the light sources, allows for adjusting and optimizing the distribution of light, emitted by the lighting elements; it allows in particular for forming a plurality of focused light beams, emitted by the plurality of lighting elements.

According to an embodiment, the plurality of lighting devices are configured to be mounted to the exterior of the rotorcraft in fixed positions and/or orientations, and the lighting modules are configured to remain stationary within the respective lighting devices. In such a configuration, the lighting modules of the respective lighting devices are configured to emit light into preset different spatial directions. The lighting elements may also be stationary within the respective lighting modules and may be configured for emitting the light in different spatial directions, respectively.

Such a rotorcraft lighting equipment does not comprise movable mechanical parts that need to be moved for adjusting the distribution of light to the current needs. Avoiding the need for mechanically movable parts may enhance the operational reliability of the rotorcraft lighting equipment and may reduce the need for repair and maintenance.

According to an embodiment, each of the lighting modules is configured for emitting light into a predefined spatial sector, in particular into a spatial cone having an opening angle of between 5° and 20°, further in particular between 10° and 15°, yet further in particular 12°.

According to an embodiment, the lighting modules of each lighting device are arranged so that the predefined spatial sectors of adjacent lighting modules seamlessly abut against each other, so that there are no unlit areas between adjacent illuminated areas. Such a rotorcraft lighting equipment may allow for generating a continuous illuminated area, which does not comprise any unlit dark gaps.

According to an embodiment, the lighting modules of each lighting device are arranged so that the predefined spatial sectors of adjacent lighting modules at least partially overlap with each other. The extension of overlap may include 5% to 20%, in particular 10% to 15%, of the respectively adjacent illuminated areas.

According to an embodiment, the lighting modules of each lighting device are arranged on a common mounting structure, in particular on a curved surface of the common mounting structure. The curved surface may in particular be a spherical or ellipsoidal surface. Arranging the lighting modules of each lighting device on a curved surface, such as a spherical or ellipsoidal surface, may cause the lighting modules to emit light in inherently different spatial directions, thereby covering a large spatial area, in particular a spatial area covering a large angle, with the light emitted by the plurality of lighting modules.

According to an embodiment, each lighting device comprises more than 20 lighting modules. Each lighting device may for example comprise 36 lighting modules. The 36 lighting modules may be arranged in a 6×6 matrix configuration or in a closed-packed circle configuration. A 6×6 matrix configuration and a closed-packed circle configuration allow for efficiently arranging 36 lighting modules with a comparatively small top area, resulting in a compact lighting device.

According to an embodiment, at least one of the lighting devices comprises another functional device, such as a camera or a laser-light source, which is arranged among the lighting modules. The other functional device may in particular be arranged in a center of the configuration of lighting modules. Adding another functional device, such as a camera or a laser-light source, adds additional functionality to the at least one lighting device. This may enhance the usefulness of the rotorcraft lighting equipment.

According to an embodiment, the plurality of lighting devices comprise at least two of the following lighting devices: a nose lighting device configured to be mounted to a nose (central front portion) of the rotorcraft, in particular to a region below the cockpit of the rotorcraft; a left front lighting device configured to be mounted to a left front portion of the fuselage of the rotorcraft; a right front lighting device configured to be mounted to a right front portion of the fuselage of the rotorcraft; a left rear lighting device configured to be mounted to a left rear portion of the fuselage of the rotorcraft; a right rear lighting device configured to be mounted to a right rear portion of the fuselage of the rotorcraft; and a belly lighting device configured to be mounted to an underside of the fuselage and/or to a landing gear of the rotorcraft. The plurality of lighting devices may comprise any subset or all of the nose lighting device, the left front lighting device, the right front lighting device, the left rear lighting device, the right rear lighting device, and the belly lighting device.

Rotorcraft lighting equipment comprising at least two of these lighting devices allows for illuminating different areas located around the rotorcraft by selectively operating the lighting modules of said lighting devices. The light distribution, which can be emitted by a combination of at least two of the above mentioned lighting devices, may in particular cover spatial areas extending in different directions from the rotorcraft.

According to an embodiment, a rotorcraft according to an exemplary embodiment of the invention further comprises a controllable winch, including a hooking device which may be lowered from the rotorcraft to pick up persons or objects being hooked to the hooking device. The rotorcraft may further comprise a winch control system, which is configured for controlling the operation of the winch.

In such a rotorcraft comprising a winch and a winch control system, the lighting control device may comprises a first control input associated with the winch and configured for allowing crew members, controlling the winch, to input control commands to the lighting control device for adjusting the distribution of light, emitted by the rotorcraft lighting equipment, in correspondence with the operation of the winch. Alternatively or additionally, the lighting control device may be coupled with the winch control system for allowing the winch control system to control the distribution of light, emitted by the rotorcraft lighting equipment, in correspondence with the operation of the winch.

According to an embodiment, the lighting control device is connected with a pilot input device, allowing a pilot, or another cockpit crew member of the rotorcraft, to input control commands to the lighting control device for adjusting the distribution of light, emitted by the rotorcraft lighting equipment, in order to allow for a safe operation of the rotorcraft.

According to an embodiment, the rotorcraft further comprises an automated anti-collision device, and the lighting control device is connected with the anti-collision device, allowing the anti-collision device to input control commands to the lighting control device for automatically adjusting the distribution of light, emitted by the rotorcraft lighting equipment, based on information provided by the anti-collision device. Such a configuration may for example allow for automatically illuminating potential obstacles, detected by the anti-collision device. This may enhance the safety of operating the rotorcraft, as potential obstacles may be illuminated and thereby made visible to the pilot at an early stage of approaching said potential obstacles.

According to an embodiment, the winch crew, the winch control system, the cockpit crew, in particular the pilot, and the anti-collision device may control the distribution of light emitted by the lighting equipment independently of each other. In consequence, the distribution of light may be simultaneously adjusted to different needs. According to an embodiment of the invention, the illumination of obstacles, for example, may not be affected by adjusting the light distribution generated for illuminating the operational area of the winch, and the light distribution generated for illuminating the operational area of the winch may not be affected when obstacles are identified and illuminated by adjusting the light distribution generated by the rotorcraft lighting equipment. As a result, the operational safety of the rotorcraft may be enhanced even further.

According to an embodiment, the method of illuminating an environment of a rotorcraft via rotorcraft lighting equipment comprises determining an illumination pattern for the current environment of the rotorcraft; mapping the illumination pattern to the different spatial directions of the plurality of lighting modules of the plurality of lighting devices; and individually controlling the plurality of lighting modules of the plurality of lighting devices on the basis of said mapping, in order to provide an optimized illumination of the current environment of the rotorcraft. These steps may be repeated, in particular periodically repeated, during the operation of the rotorcraft for adjusting the illumination of the environment of the rotorcraft to changing environmental conditions.

BRIEF DESCRIPTION OF THE DRAWINGS

Embodiments of the invention are described in greater detail below with reference to the Figures, wherein.

DETAILED DESCRIPTION

Figure 1:
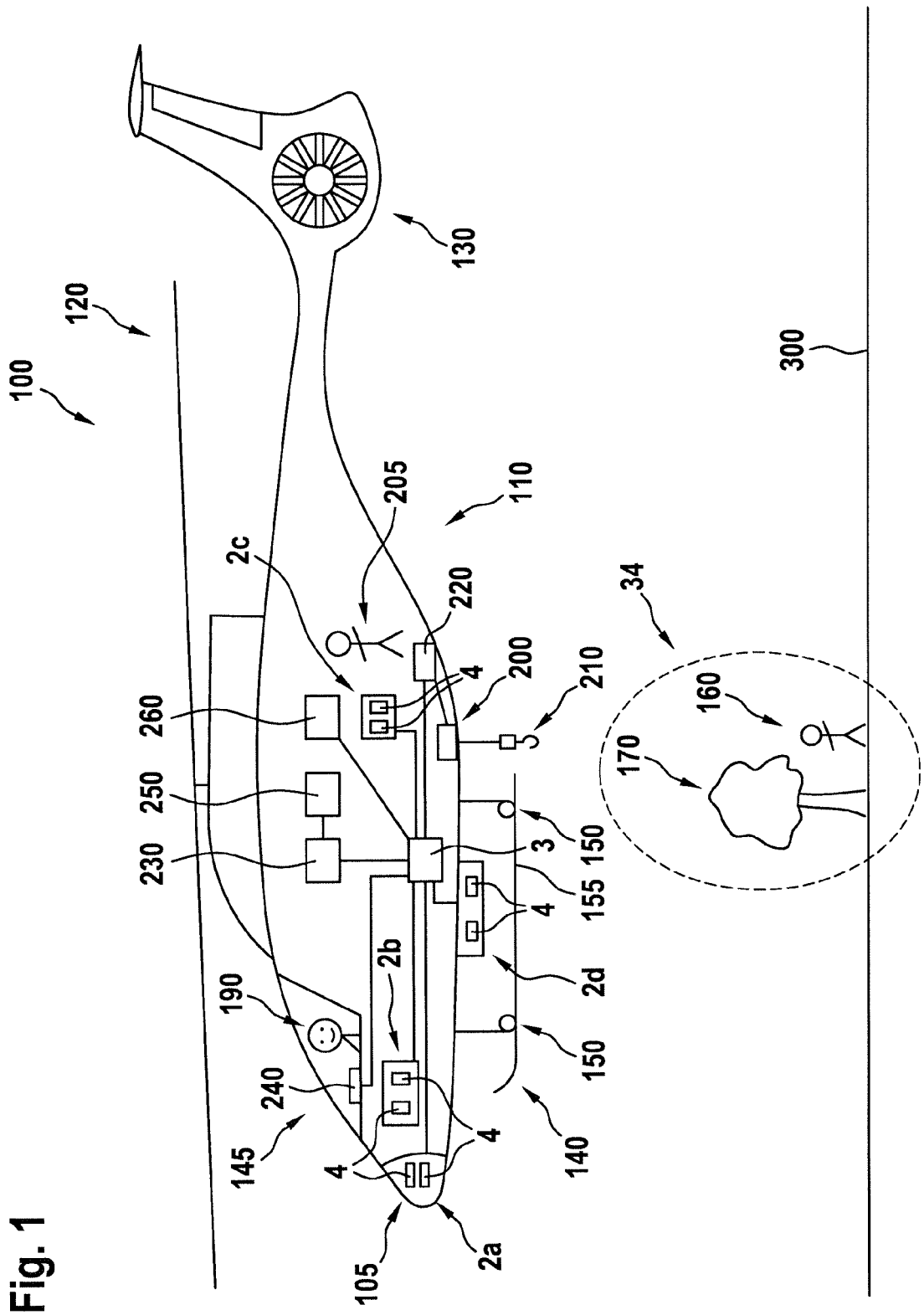
FIG. 1 depicts a schematic drawing of a rotorcraft, in particular a helicopter, comprising rotorcraft lighting equipment according to an exemplary embodiment of the invention.

FIG. 1 shows a schematic side view of a rotorcraft, in particular a helicopter, 100, comprising rotorcraft lighting equipment 2a-2d, 3 according to an exemplary embodiment of the invention.

The helicopter 100 comprises a fuselage 110, a main rotor 120 and a tail rotor 130. Although not explicitly shown in the Figures, the helicopter 100 may alternatively comprise two counter-rotating main rotors 120 and no tail rotor 130.

The helicopter 100 further comprises a cockpit 145 and a landing gear 140. The landing gear 140 may include wheels 150 and/or skids 155.

The helicopter 100 also comprises a winch 200 including a movable hooking device 210, which may be lowered from the helicopter 100 for picking up persons 160 and/or objects 170, and a winch control system 220, which is configured for controlling the movement of the hooking device 210.

Rotorcraft lighting equipment 2a-2d, 3 according to an exemplary embodiment of the invention comprises a plurality of lighting devices 2a-2d mounted to the helicopter 100. In the embodiment depicted in FIG. 1, the lighting devices 2a-2d are mounted to the fuselage 110 of the helicopter 100.

The lighting devices 2a-2d are in particular mounted to portions of the fuselage 110 below the cockpit 145 of the helicopter 100 for conveniently illuminating regions 34 below the helicopter 100.

The lighting devices 2a-2d in particular include a nose lighting device 2a, configured to be mounted to a central front portion ("nose") 105 of the fuselage 110 of the helicopter 100; a left front lighting device 2b, configured to be mounted to a left front portion of the fuselage 110 of the helicopter 100; a right front lighting device (not visible in FIG. 1), configured to be mounted to a right front portion of the fuselage 110 of the helicopter 100; a left rear lighting device 2c, configured to be mounted to a left rear portion of the fuselage 110 of the helicopter 100; a right rear lighting device (not visible in FIG. 1), configured to be mounted to a right rear portion of the fuselage 110 of the helicopter 100, and a belly lighting device 2d, configured to be mounted to an underside of the fuselage 110 and/or to the landing gear 140 of the helicopter 100.

Each lighting device 2a-2d comprises a plurality of lighting modules 4, which are configured for emitting light in different spatial directions. The structure of the lighting modules 4 will be discussed in more detail further below referring to FIGS. 2 to 6.

The rotorcraft lighting equipment 2a-2d, 3 further comprises a lighting control device 3, which is configured for individually controlling the operation of the plurality of lighting devices 2a-2d, in order to generate a desired light distribution of the light emitted by the plurality of lighting devices 2a-2d.

A pilot input device 240, an anti-collision input device 230, and a winch operator input device 260 are coupled to the lighting control device 3 and allow for inputting commands into the lighting control device 3.

Different light distributions may be generated by appropriately controlling the operation of the plurality of lighting devices 2a-2d. As a result, different lighting functionalities may be realized by the rotorcraft lighting equipment 2a-2d, 3. For example, the plurality of lighting devices 2a-2d may be controlled such that the rotorcraft lighting equipment 2a-2d, 3 operates as a helicopter landing light, illuminating a dedicated landing area. Additionally or alternatively, the lighting devices 2a-2d may be controlled such that the rotorcraft lighting equipment 2a-2d, 3 provides the functionality of a search light and/or of a winch light. Rotorcraft lighting equipment 2a-2d, 3 according to exemplary embodiments of the invention in particular may be operated to provide different types of lighting simultaneously and independently of each other.

The direction of one or more light beams, emitted by the rotorcraft lighting equipment 2a-2d, 3, may be modified without moving the lighting devices 2a-2d with respect to the fuselage 110 of the helicopter 100. In consequence, the rotorcraft lighting equipment 2a-2d, 3 according to exemplary embodiments of the invention may be employed as a landing light and/or as a search light and/or as a winch light, tracking a desired target object 160, 170, without employing mechanically movable parts. Avoiding the need for mechanically movable parts may enhance the operational reliability of the rotorcraft lighting equipment 2a-2d, 3 and reduce the need for repair and maintenance.

Each of the lighting devices 2a-2d may be configured for emitting light with an intensity of at least 20 kcd, in particular with an intensity of at least 200 kcd. Lighting devices 2a-2d configured for emitting light with intensities of least 20 kcd, may provide for an effective illumination of the environment, in particular for detecting target objects in a dark environment.

Figure 2:
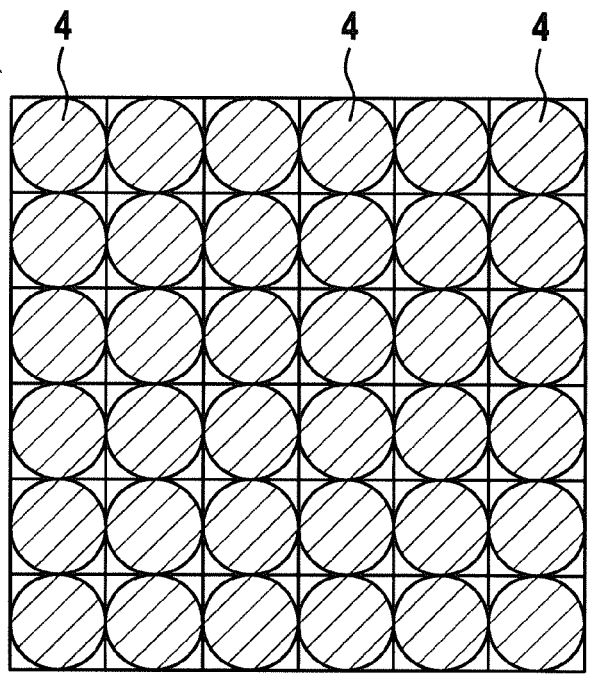
FIG. 2 depicts a schematic view of a lighting device, as may be used in rotorcraft lighting equipment according to an exemplary embodiment of the invention.

FIG. 2 depicts a schematic view of a lighting device 2a, as may be used in rotorcraft lighting equipment according to an exemplary embodiment of the invention.

The lighting device 2a comprises a plurality of lighting modules 4, arranged in a six by six (6×6) rectangular, in particular quadratic, configuration.

The arrangement of the lighting modules 4 depicted in FIG. 2 is only exemplary, and a lighting device 2a according to an exemplary embodiment of the invention may comprise more or less than 6×6 (36) lighting modules 4. The lighting modules 4 also may be arranged in different configurations than the rectangular configuration depicted in FIG. 2.

Figure 3:
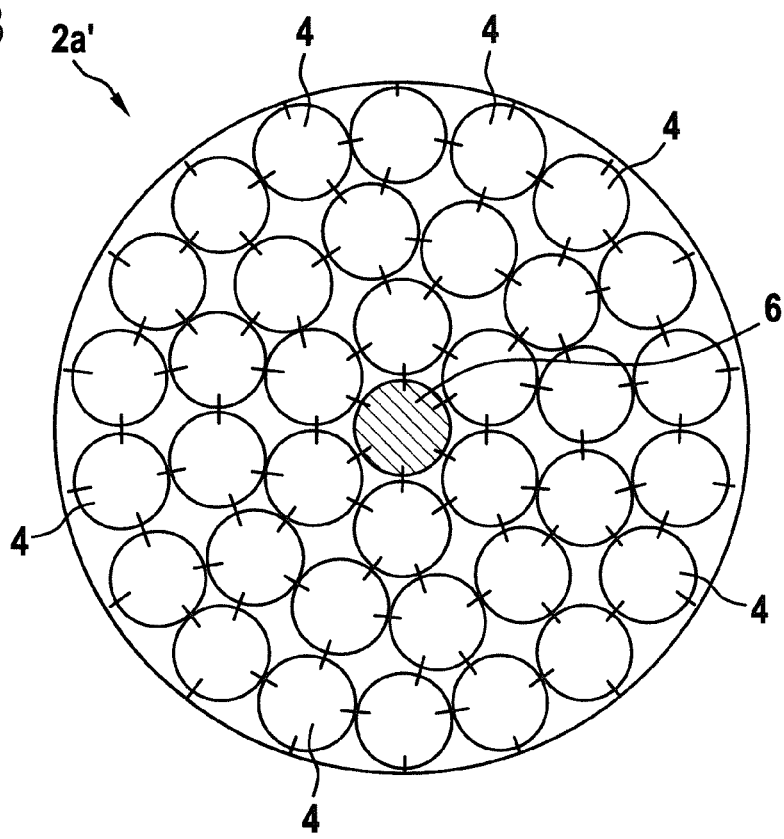
FIG. 3 depicts a schematic view of an alternative configuration of a lighting device, as may be used in rotorcraft lighting equipment according to an exemplary embodiment of the invention.

FIG. 3, for example, depicts an alternative configuration, in which 36 lighting modules 4 are arranged in a closed-packed circle configuration, resulting in a basically circular outer contour of the lighting device 2a'. Of course, more or less than 36 lighting modules 4 may be arranged in a closed-packed circle configuration as well.

In the closed-packed circle configuration depicted in FIG. 3, the 36 lighting modules 4 are arranged around a central module 6, which is arranged at the center of the circular configuration. The central module 6 may be an additional (37th) lighting module 4, or it may be an alternative functional device 6, such as a camera or a laser-light source, adding additional functionality to the lighting device 2a'.

In alternative configurations, which are not explicitly shown in the Figures, any of the lighting modules 4 may be replaced by such an alternative functional device 6, or at least one of the lighting modules 4 may additionally include such an alternative functional device 6 for adding additional functionality to the lighting device 2.

The lighting modules 4 are configured for emitting light into different spatial directions. The distribution of light, emitted by each lighting device, may be adjusted by selectively switching the lighting modules 4 on and/or off.

In order to cause the lighting modules 4 to emit light in different spatial directions, the lighting modules 4 may be arranged on a curved surface 8 of a mounting structure 10 of the lighting device 2a', resulting in different spatial orientations of the lighting modules 4. It is also possible that the lighting modules 4 are arranged on a substantially plane mounting structure and that the different spatial directions are achieved via inclining light sources and/or via directing light into the different spatial directions via according optical systems.

Figure 4:
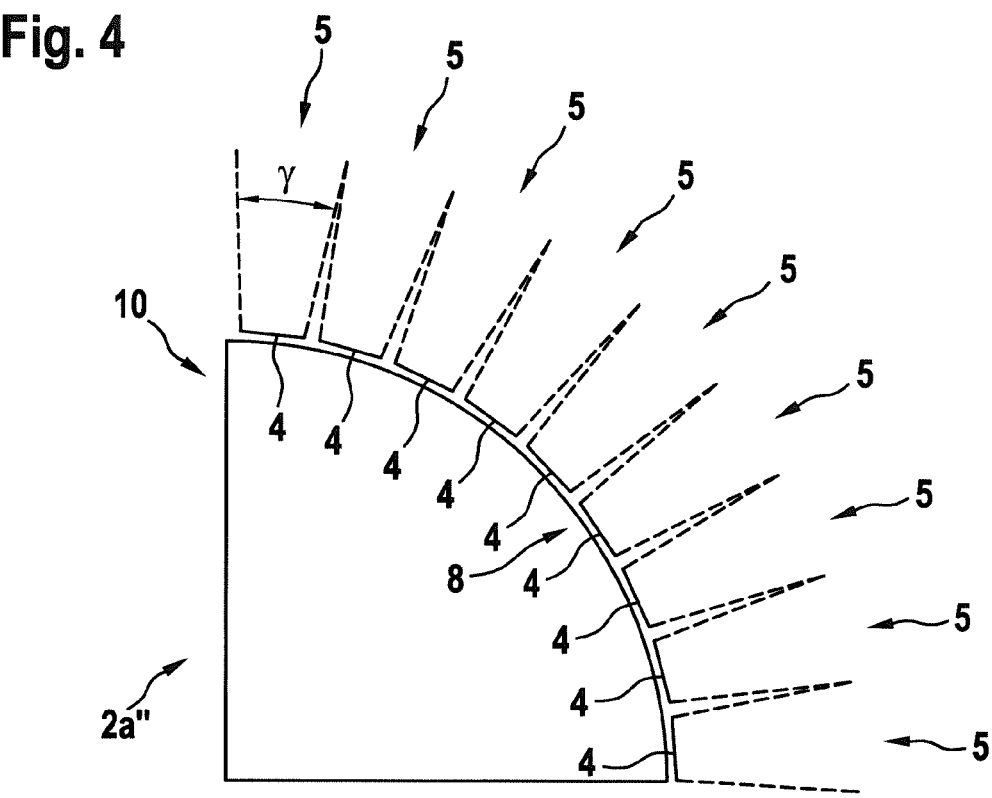
FIG. 4 schematically depicts a cross-sectional view through a lighting device, as may be used in rotorcraft lighting equipment according to an exemplary embodiment of the invention.

FIG. 4 schematically depicts a cross-sectional view through a lighting device 2a", comprising a mounting structure 10 having a curved outer peripheral surface 8. The lighting modules 4 are arranged on said curved surface 8. The curved surface 8 may be a part of a sphere, such as a hemisphere, allowing the lighting device 2a" to emit light in an angular range of 360° in a first plane, and to emit light in an angular range of 180° in a second plane, which is oriented orthogonally to the first plane.

The curved surface 8, however, does not need to be a spherically shaped surface 8. The curved surface 8 may, for example, have the shape of a portion of an ellipsoid, i.e. it may be elliptical in cross-section. The curved surface 8 may further have any other convex or concave shape which is suitable for generating desired different spatial directions for the light, emitted by the lighting modules 4.

Each of the lighting modules 4 may be configured for emitting light into a predefined spatial sector 5, in particular into a spatial cone 5 having an opening angle γ of between 5° and 20°, further in particular between 10° and 15°, yet further in particular 12°.

A lighting device 2a, 2a' comprising 36 lighting modules 4, as depicted in FIGS. 2 and 3, wherein each of the lighting modules 4 is configured for emitting light into a spatial cone 5 having an opening angle of 12°, allows for emitting light in an overall light cone having an opening angle of 72°.

Figure 5:
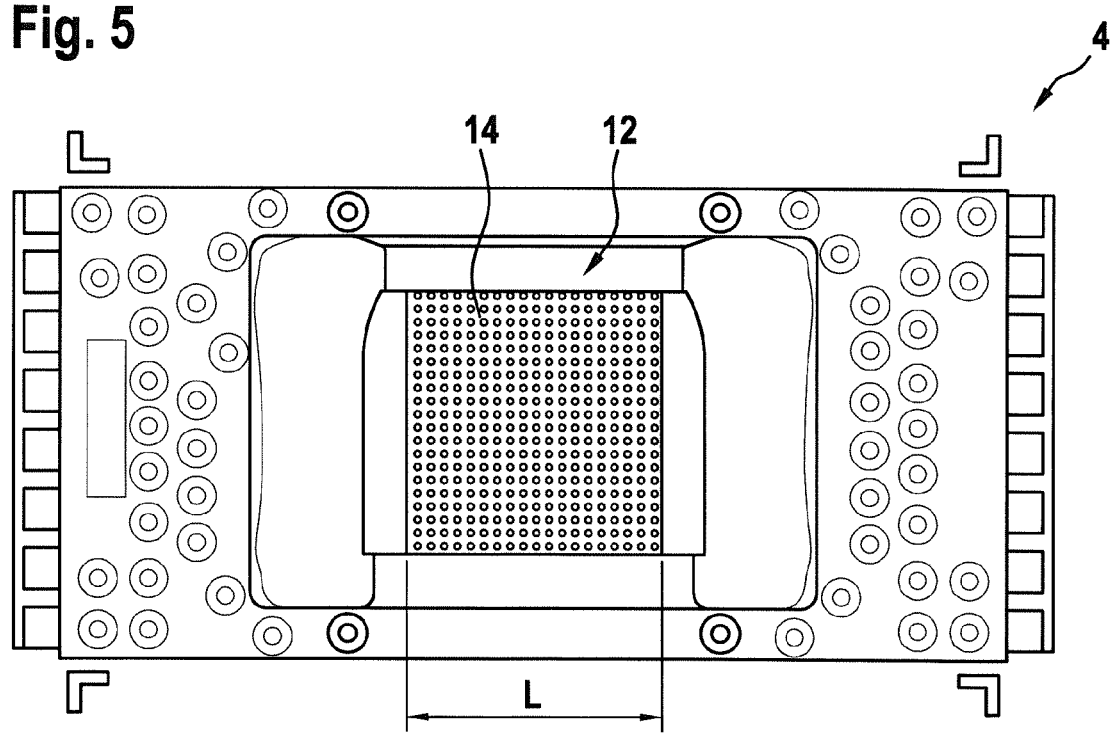
FIG. 5 depicts a plan view of a lighting module, as may be used in rotorcraft lighting equipment according to an exemplary embodiment of the invention.

FIG. 5 shows a plan view of a lighting module 4, as may be used in rotorcraft lighting equipment according to an exemplary embodiment of the invention. The lighting module 4 depicted in FIG. 5 includes a semiconductor chip 12 comprising a plurality of lighting elements 14. The semiconductor chip 12 has a rectangular shape, and the plurality of lighting elements 14 are arranged in a rectangular configuration, in particular in a quadratic configuration, having a side length L of 3 mm to 6 mm, in particular a side length L of 4 mm.

In the exemplary embodiment depicted in FIG. 5, the lighting module 4 comprises 32×32 (=1024) lighting elements 14. The individual lighting elements 14 are configured for emitting light in different directions, and the individual lighting elements 14 may be operated independently from each other. As a result, the distribution of light, emitted by each of the lighting modules 4, may be adjusted by selectively operating the individual lighting elements 14.

Selectively operating the individual lighting elements 14 may include switching the lighting elements 14 individually on and off. Selectively operating the individual lighting elements 14 may also include individually dimming the lighting elements 14, i.e. individually adjusting the amount (brightness) of light emitted by each of the lighting elements 14.

Dimming the lighting elements 14 may include adjusting the brightness of the light emitted by each of the lighting elements 14 on a continuous scale. It may also include switching the brightness of the light, emitted by each of the lighting elements 14, between a plurality of discrete operational modes, wherein the brightness of the light emitted by each of the lighting elements 14 is different in each of said operational modes.

Figure 6:
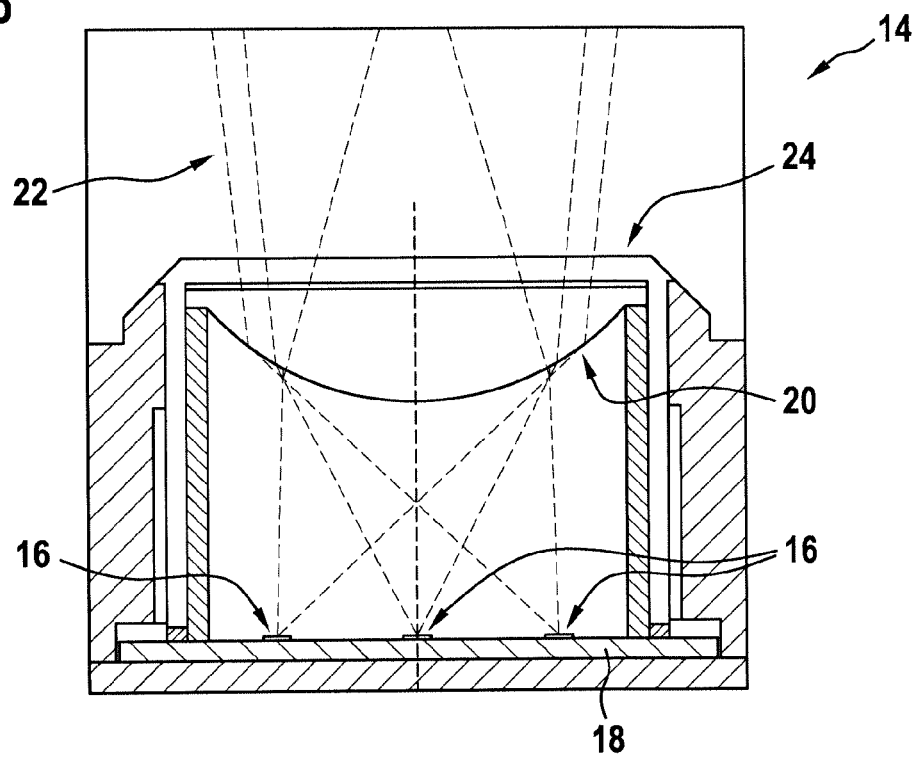
FIG. 6 depicts a cross-sectional view through a lighting element, as may be used in rotorcraft lighting equipment according to an exemplary embodiment of the invention.

FIG. 6 depicts a cross-sectional side view through a lighting element 14, as may be used in rotorcraft lighting equipment according to an exemplary embodiment of the invention.

The lighting element 14 comprises at least one light source 16. The at least one light source 16 may in particular be at least one LED. In particular, a plurality of LEDs may be formed on a common substrate 18. In the embodiment depicted in FIG. 6, the lighting element 14 comprises three light sources 16, formed on a common substrate or circuit board 18.

The lighting element 14 further comprises an optical element 20, in particular a lens 20, which is configured for directing and focusing the light emitted by the light sources 16 and forming a light beam 22 emitted by the lighting element 14.

Although only a lens 20 is shown in FIG. 6, the lighting element 14 may further comprise a reflector and/or a shutter in addition or alternatively to the lens 20. The optical element 20 may in particular be a collimating optical element 20, such as a collimating lens and/or a collimating reflector.

The lighting element 14 also comprises an at least partially light transmissive cover 24, covering and protecting the light source(s) 16 and the optical element 20.

In the following, the principles of operating the rotorcraft lighting equipment 2a-2d, 2a', 2a", 3 according to an exemplary embodiment of the invention are explained with reference to FIG. 7.

Figure 7:
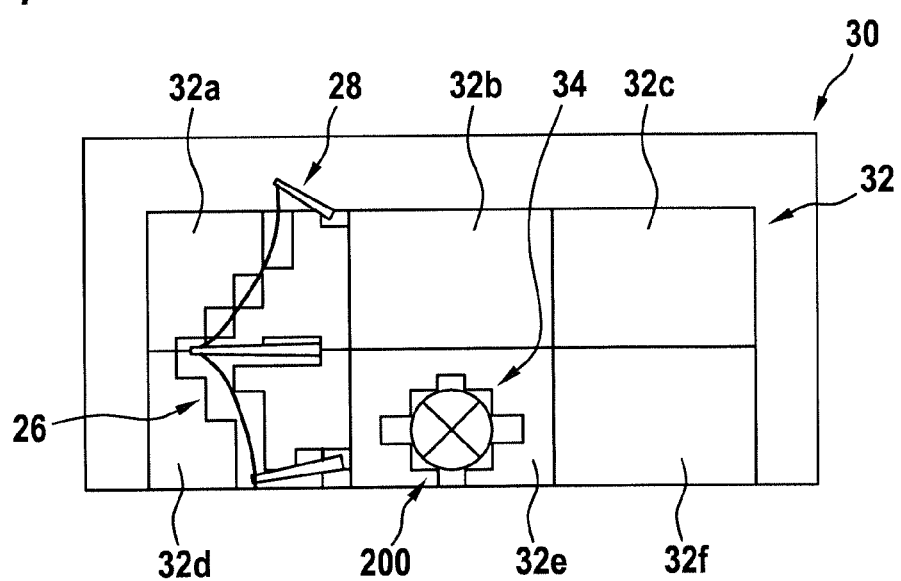
FIG. 7 depicts a schematic top view of a region below a helicopter, wherein parts of the region are illuminated by rotorcraft lighting equipment according to an exemplary embodiment of the invention.

FIG. 7 depicts a schematic top view of a region below the helicopter 100; the helicopter 100 itself is not shown in FIG. 7.

The area 30 marks the maximum field of view of the cockpit crew 190 of the helicopter 100. The area 32 indicates the maximum illuminable area 32 below the helicopter 100, i.e. the maximum extent of the area that may be illuminated by operating the rotorcraft lighting equipment 2a-2d, 2a', 2a", 3.

Areas 32a-32f are sub-areas 32a-32f of the illuminable area 32, wherein each of said sub-areas 32a-32f is illuminable by one of the lighting devices of the rotorcraft lighting equipment, respectively.

The sub-areas 32a-32f abut against each other, constituting a continuous, i.e. seamless, illuminable area 32 below the helicopter 100. Optionally, adjacent sub-areas 32a-32f may at least partially overlap with each other. Adjacent sub-areas 32a-32f may overlap over a portion of up to 20%, in particular over a portion of up to 10%, of the adjacent sub-areas 32a-32f.

An electric power line 28 representing a potential obstacle 28 is present in the illuminable area 32 below the helicopter 100. In particular, when the helicopter 100 is flying at low heights and/or is approaching the ground 300 for landing, obstacles 28 such as electric power lines 28 need to be recognized by the cockpit crew 190, in particular the pilot 190, of the helicopter 100, in order to avoid a collision of the helicopter 100 with such an obstacle 28.

It is desirable to illuminate the obstacle 28, in order to be recognized by the cockpit crew 190 of the helicopter 100, even under adverse visibility conditions, in particular during the night, or when the helicopter is flying through fog, rain, etc.

In the example depicted in FIG. 7, the lighting elements 14 of the rotorcraft lighting equipment 2a-2d, 2a', 2a", 3 are controlled for illuminating the power line 28, i.e. an area 26 surrounding the power line 28.

The rotorcraft lighting equipment 2a-2d, 2a', 2a", 3 may be controlled manually by the cockpit crew 190 by inputting control commands into the lighting control device 3 via the pilot input device 240 provided in the cockpit 145 (cf. FIG. 1).

The rotorcraft lighting equipment 2a-2d, 2a', 2a", 3, for example, may be operated as a landing light or as a manual search light, wherein the direction, the width and/or the intensity of the light beam, emitted by the rotorcraft lighting equipment 2a-2d, 2a', 2a", 3, are controlled manually by the cockpit crew 190 of the helicopter 100, in particular by the pilot 190, via the pilot input device 240.

Additionally or alternatively, the rotorcraft lighting equipment 2a-2d, 2a', 2a", 3 may be controlled by an automated anti-collision device 250, which is configured for detecting potential obstacles 28 in the flight path of the helicopter 100 and providing input to the lighting control device 3 via the anti-collision input device 230 for illuminating the detected potential obstacles 28.

In the example depicted in FIG. 7, the lighting elements 14 of the rotorcraft lighting equipment 2a-2d, 2a', 2a", 3 are further controlled to additionally illuminate an operational area 34 of the winch 200, i.e. an area 34 of the ground 300 below the winch 200 of the helicopter 100.

When the winch 200 of the helicopter 100 is operated for lifting persons 160 and/or objects 170 from the ground 300, it is desirable to illuminate the operational area 34 of the winch 200, i.e. the area 34 of the ground 300 surrounding the persons 160 and/or objects 170 to be lifted, in order to reliably identify the persons 160 and/or objects to be lifted and to allow for a safe operation of the winch 200.

For coordinating the illumination of the operational area 34 of the winch 200 with the operation of the winch 200, the lighting control device 3 may be coupled with the winch control system 220 for receiving commands for controlling the operation of the rotorcraft lighting equipment 2a-2d, 2a', 2a", 3 from the winch control system 220.

Alternatively or additionally, the lighting control device 3 may comprise a winch operator input device 260, which is configured for allowing crew members 205 operating the winch 200 to input control commands into the lighting control device 3 for coordinating the illumination in the operational area 34 with the operation of the winch 200.

The crew members operating the winch 200, the cockpit crew 190 and the automated anti-collision device 250 may control the distribution of light emitted by the lighting equipment 2a-2d, 2a', 2a", 3 independently of each other. I.e., in the example depicted in FIG. 7, the illumination of the power line 28 may be controlled independently of the illumination of the operational area 34 of the winch 200.

As a result, any obstacles 28, such as power lines 28, located in the illuminable area 32 as well as the operational area 34 of the winch 200 may be illuminated in an optimized manner, respectively. In other words, adjusting the illumination of one portion of the illuminable area 32, such as the operational area 34 of the winch 200, does not deteriorate the illumination of other areas 26, such as areas 26 around obstacles 28 in the pilot's field of view 30.

In consequence, the illumination of the space surrounding the helicopter 100 may be individually adjusted to the current situation, resulting in an optimized illumination of all currently interesting parts of said space.

While the invention has been described with reference to exemplary embodiments, it will be understood by those skilled in the art that various changes may be made and equivalence may be substituted for elements thereof without departing from the scope of the invention. In addition, many modifications may be made to adapt a particular situation or material to the teaching of the invention without departing from the essential scope thereof Therefore, it is intended that the invention not be limited to the particular embodiments disclosed, but that the invention will include all embodiments falling within the scope of the appended claims.

The invention claimed is:

1. A rotorcraft lighting equipment, comprising:
 a plurality of lighting devices configured to be mounted to an exterior of a rotorcraft, wherein each of the lighting devices comprises a plurality of individually controllable lighting modules which are configured for emitting light into different spatial directions;
 wherein the plurality of lighting devices are configured to be mounted to the exterior of the rotorcraft in fixed positions and orientations;
 wherein the lighting modules are stationary within the respective lighting devices, with the lighting modules of the respective lighting devices having preset different spatial directions; and
 wherein the rotorcraft lighting equipment further comprises a lighting control device configured for individually controlling the operation of the plurality of lighting modules for generating a desired light distribution of the light emitted by the plurality of lighting modules.

2. The rotorcraft lighting equipment according to claim 1, wherein each of the lighting modules comprises a plurality of lighting elements configured for emitting light into different spatial directions, with each of the plurality of lighting elements comprising a light source.

3. The rotorcraft lighting equipment according to claim 2, wherein each of the plurality of lighting elements is individually controllable by the lighting control device and wherein the lighting control device is configured for individually controlling the operation of each of the plurality of lighting elements.

4. The rotorcraft lighting equipment according to claim 3, wherein each of the plurality of lighting elements comprises at least one optical element associated with the light source of the lighting element and configured for directing and/or focusing the light emitted by the respective associated light source.

5. The rotorcraft lighting equipment according to claim 1, wherein each of the lighting modules is configured for emitting light into a predefined spatial sector.

6. The rotorcraft lighting equipment according to claim 1, wherein each of the lighting devices is configured for emitting light with an intensity of at least 20 kcd.

7. The rotorcraft lighting equipment according to claim 1, wherein the lighting modules of each lighting device are arranged on a common mounting structure.

8. The rotorcraft lighting equipment according to claim 1, wherein each lighting device comprises more than 20 lighting modules.

9. The rotorcraft lighting equipment according to claim 1, wherein each lighting device comprises 36 lighting modules arranged in a matrix configuration or in a closed-packed circle configuration.

10. The rotorcraft lighting equipment according to claim 1, wherein one or more or all of the lighting devices comprise(s) another functional device.

11. The rotorcraft lighting equipment according to claim 1, wherein the plurality of lighting devices comprise at least two of the following:
 a nose lighting device configured to be mounted to a nose of the rotorcraft;
 a left front lighting device configured to be mounted to a left front portion of a fuselage of the rotorcraft;
 a right front lighting device configured to be mounted to a right front portion of the fuselage of the rotorcraft;
 a left rear lighting device configured to be mounted to a left rear portion of the fuselage of the rotorcraft;
 a right rear lighting device configured to be mounted to a right rear portion of the fuselage of the rotorcraft; and
 a belly lighting device configured to be mounted to an underside of the fuselage and/or to a landing gear of the rotorcraft.

12. A rotorcraft comprising rotorcraft lighting equipment as recited in claim 1, wherein the lighting devices are mounted to a fuselage of the rotorcraft or to a landing gear of the rotorcraft.

13. The rotorcraft according to claim 12, further comprising at least one of the following features:
 (a) the rotorcraft further comprising a winch, wherein the lighting control device is connected with a winch operator input device or with a winch control system, allowing crew members operating the winch to input control commands into the lighting control device for adjusting the distribution of light emitted by the rotorcraft lighting equipment;
 (b) wherein the lighting control device is connected with a pilot input device, allowing members of a cockpit crew of the rotorcraft to input control commands to the lighting control device for adjusting the distribution of light emitted by the rotorcraft lighting equipment;
 (c) the rotorcraft further comprising an automated anti-collision device, wherein the lighting control device is connected with the anti-collision device, allowing the anti-collision device to input control commands to the lighting control device for an automated adjustment of the distribution of light emitted by the rotorcraft lighting equipment, based on information provided by the anti-collision device.

14. A method of illuminating an environment of a rotorcraft via the rotorcraft lighting equipment according to claim 1 the method comprising:
 individually controlling the plurality of lighting modules of the plurality of lighting devices, depending on the respective spatial directions, for generating a desired light distribution in the environment of the rotorcraft.

15. The method according to claim 14, further comprising:

determining an illumination pattern for the environment of the rotorcraft;

mapping the illumination pattern to the different spatial directions of the plurality of lighting modules of the plurality of lighting devices; and individually controlling the plurality of lighting modules of the plurality of lighting devices on the basis of said mapping.

\* \* \* \* \*